United States Patent [19]

Lum

[11] 4,274,102
[45] Jun. 16, 1981

[54] MULTI-ELEMENT WRITING INSTRUMENT

[76] Inventor: Victor Lum, 17 Pollard St., North Billerica, Mass. 08162

[21] Appl. No.: 17,060

[22] Filed: Mar. 2, 1979

Related U.S. Application Data

[63] Continuation of Ser. No. 831,610, Sep. 8, 1977, abandoned.

[51] Int. Cl.³ ............................................. G01D 9/30
[52] U.S. Cl. .............................. 346/139 R; 33/18 R; 346/46
[58] Field of Search ..................... 346/139 R, 141, 29, 346/49, 46; 33/1 M, 18 R; 74/88; 400/18, 19, 154.4, 155, 162.3

[56] References Cited

U.S. PATENT DOCUMENTS

| 2,191,673 | 2/1940 | Moore | 346/46 |
| 2,778,710 | 1/1957 | Komas | 346/46 X |
| 2,910,876 | 11/1959 | Jackson | 74/88 |
| 3,223,072 | 12/1965 | Bross | 74/88 X |
| 3,256,969 | 6/1966 | Bretti | 400/155 |
| 3,550,276 | 12/1970 | Kramer | 33/18 R |
| 3,703,104 | 11/1972 | Tamplen | 74/88 |

FOREIGN PATENT DOCUMENTS 1010739  3/1952  France .

Primary Examiner—Joseph W. Hartary
Attorney, Agent, or Firm—Schiller & Pandiscio

[57] ABSTRACT

A multi-element writing instrument is disclosed for use in computer-operated plotters or similar graphics systems. Successive applications of a linear force applied along the axis of the instrument are converted to rotary motion which is employed to select successive elongate writing elements normally positioned at a uniform radial spacing from the axis of the writing instrument. Each selected element is displaced in a substantially axial direction a distance sufficient to extend the writing point of the element through the exit opening of the instrument.

26 Claims, 14 Drawing Figures

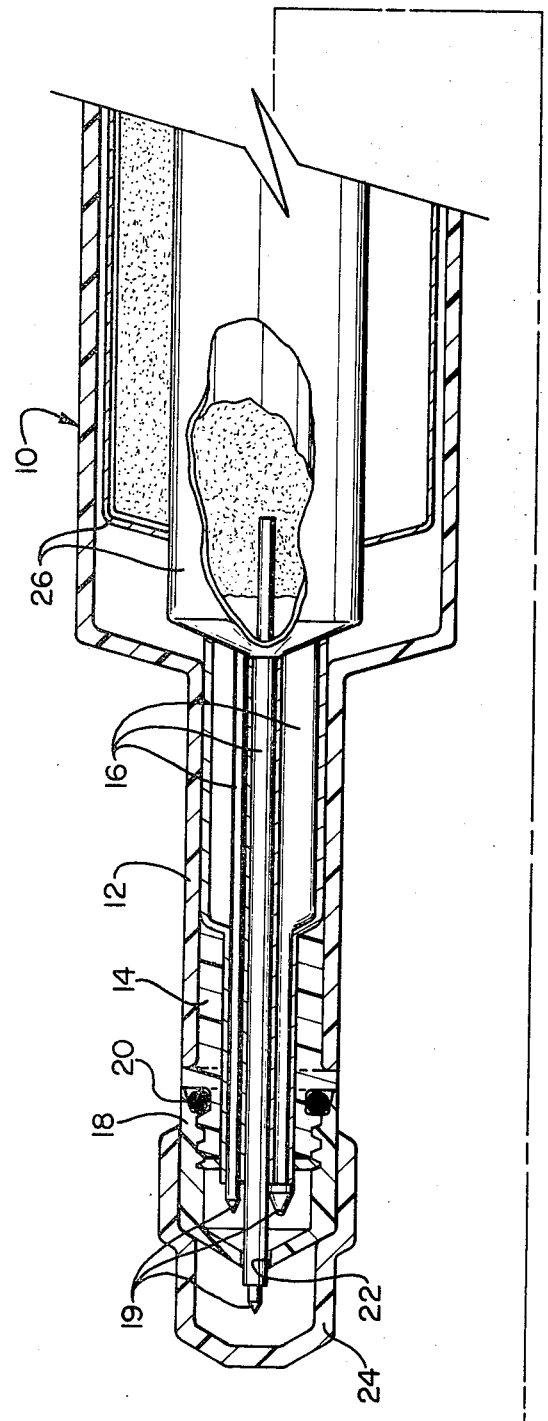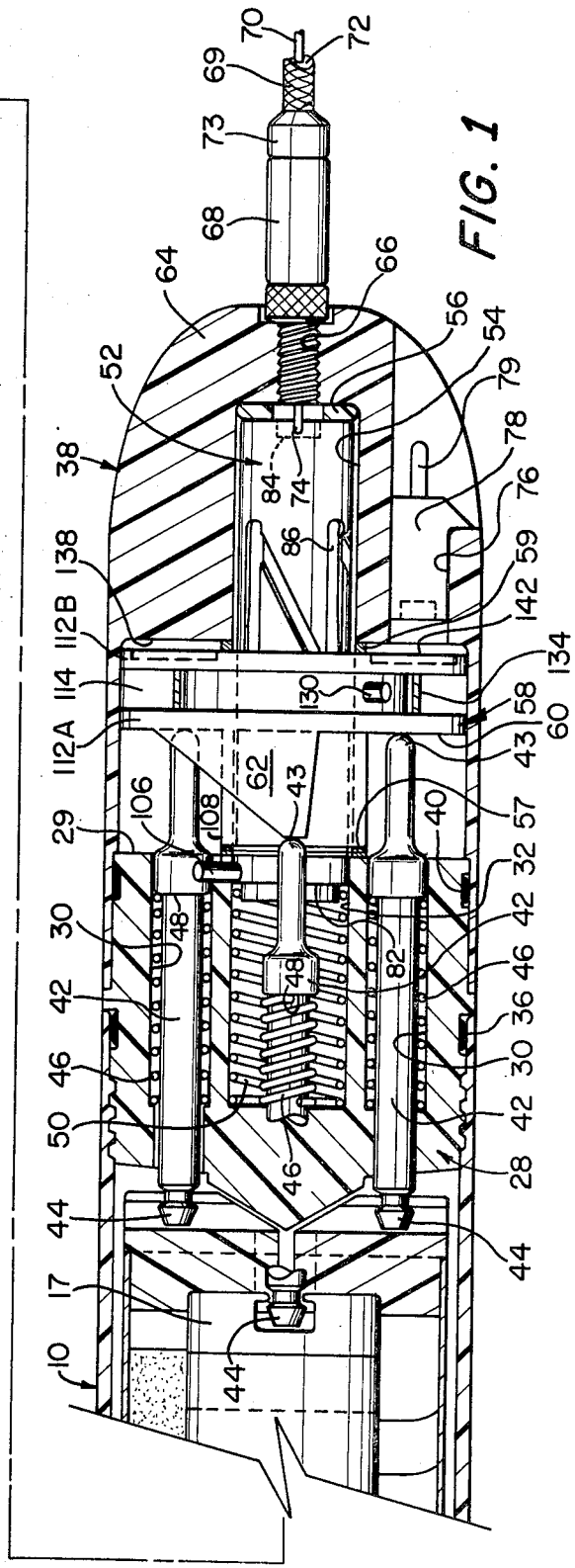
FIG. 1

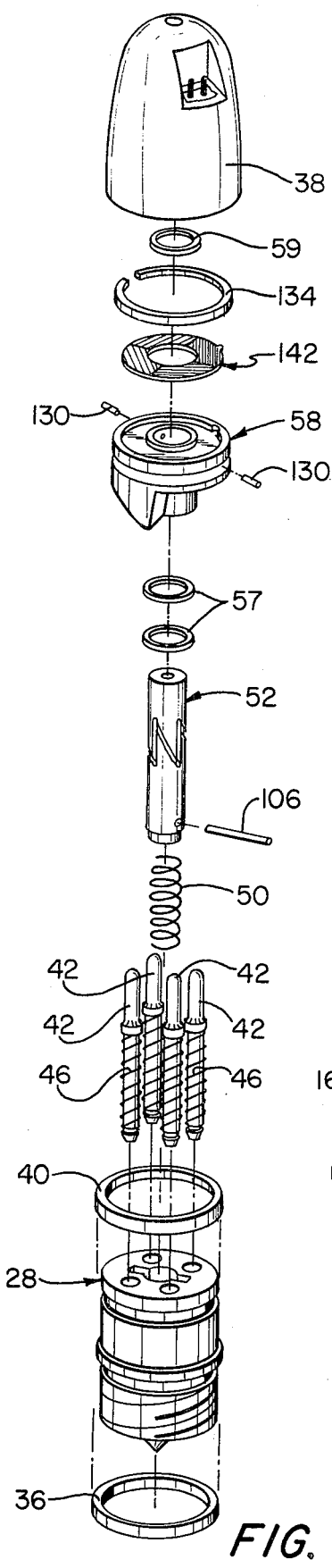
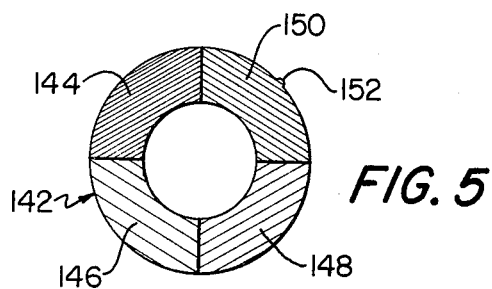
FIG. 5
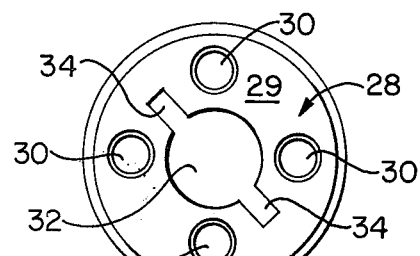
FIG. 6
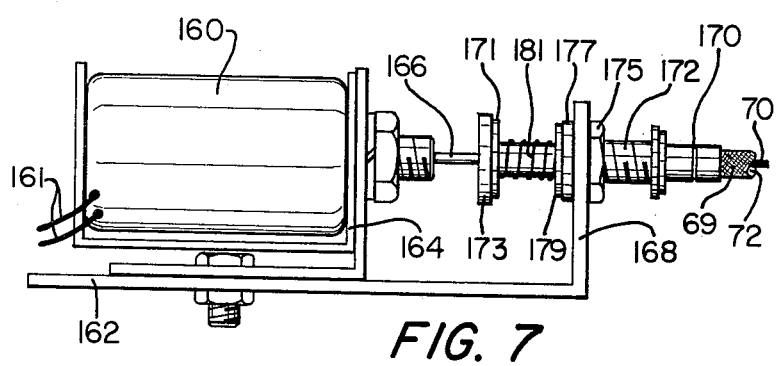
FIG. 7
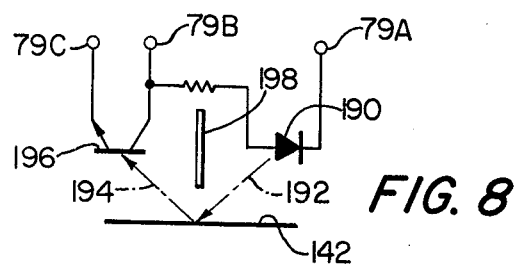
FIG. 8
FIG. 2

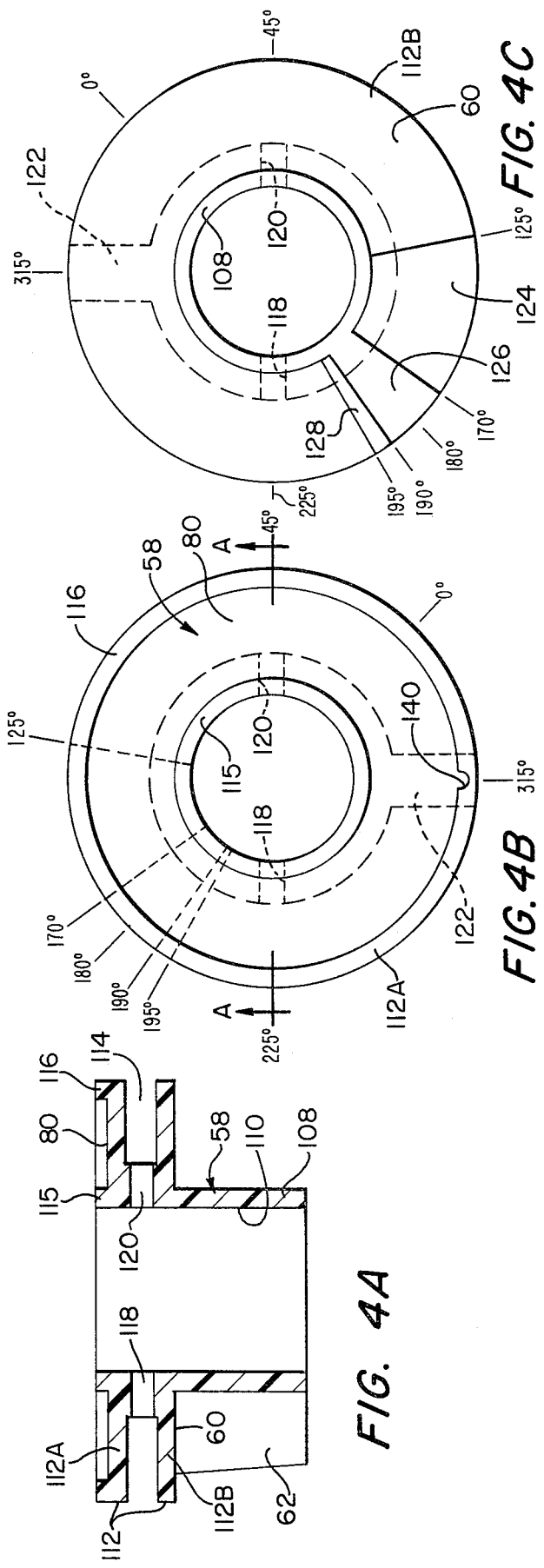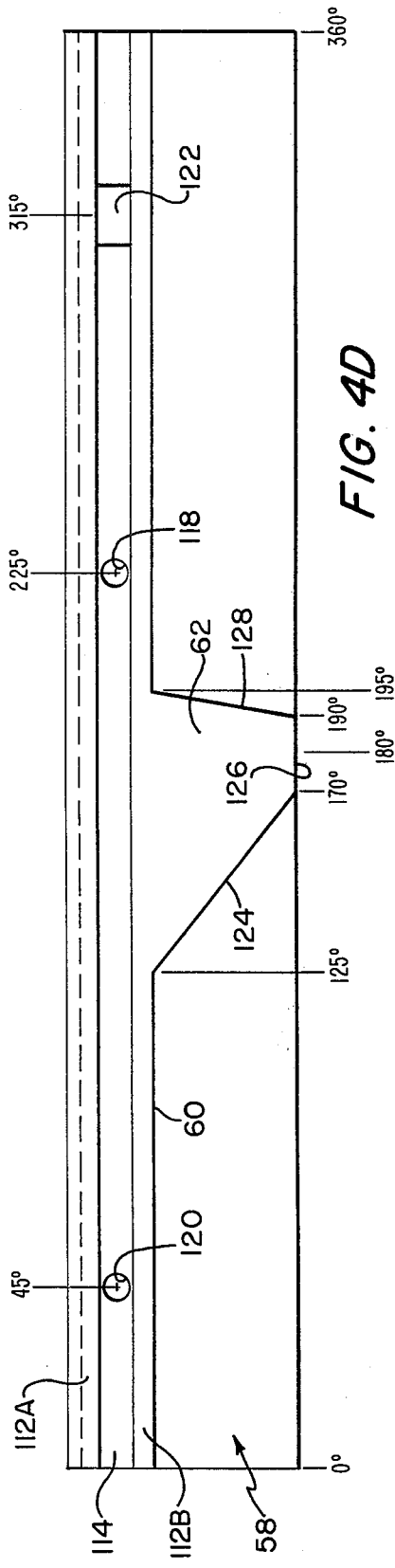

MULTI-ELEMENT WRITING INSTRUMENT

RELATED APPLICATIONS

This application is a continuation of my copending U.S. Application Ser. No. 831,610 filed Sept. 8, 1977 now abandoned.

The present invention relates in general to plotters and similar graphics systems, and in particular to a new and improved writing instrument for use in such systems wherein respective ones of a plurality of different writing elements carried by the instrument may be selected in succession.

BACKGROUND OF THE INVENTION

In a copending application by the inventor of the present invention, Ser. No. 813,442, a novel multi-element writing instrument is disclosed wherein successively selected writing elements are extended into writing position in response to the rotation of a selection unit to successive selection stations. Such an instrument finds its primary use in hand-held applications, wherein the user rotates the selection unit in accordance with the particular writing element desired. The separate writing elements may differ from each other in a number of ways, such as by color, by writing point, etc. For example, some may have ball point nibs while others have felt tip nibs, or the nibs may be of different width.

The writing instrument itself has a generally elongate body in which the individual writing elements are enclosed. In their non-selection positions, the elongate elements are uniformly spaced in a radial direction around the common axis of the instrument. Upon rotation of the selection unit, individual elements are displaced in a generally axial direction so that the writing nib of the selected element extends through the exit opening, preferably in alignment with the axis of the instrument.

In presently available computer-operated plotters or similar graphics systems such as for example flat bed systems, trend recorders etc., plotting may occur either by relative coordinate movement of the writing instrument and the paper, or by an arrangement whereby the paper remains stationary and the pen is capable of motion along coordinate axes. Additionally, the writing instrument is adapted to be selectively placed into contact with the paper, or withdrawn, by motion perpendicular to the plane of the paper.

The writing instrument may take different forms, e.g. pens with ball point or felt tip nibs, or capillary arms which feed ink from a reservoir to the writing point. Where multicolor writing is desired, the pens or capillary arms may be mounted in banks of relatively large size and the movement of the supporting arm on which the bank is mounted must take into account the spacing between respective pen nibs in order to bring the desired nib into writing position. Alternatively, the supporting arm may carry a turret at its end which turns selectively to bring different pens into writing position.

The physical size of a bank of pens may be considerable in relation to the space available within the physical dimensions of a plotter, so that the areas near the edge of the paper may not be accessible to all pens carried in the bank. While such a constraint may be avoided to some extent by the use of a turret wherein the respective pens are held in a more compact manner, both the bank and the turret arrangement are cumbersome and mechanically complex. Further, due to the relatively large weight of these arrangements it becomes difficult to support the writing instrument at a distance and to control its position quickly and accurately. These arrangements are usually custom-fitted to a selected design configuration and they are not readily adaptable to other devices without major engineering changes.

As a general rule, plotters and similar graphics devices are expensive and require a relatively large capital investment. The cost of such equipment is increased still further where features are added which enable the equipment to plot in different colors. The implementation of these features is often cumbersome as already mentioned and is suitable primarily for use in large plotters. Thus, small plotters and other small graphics systems have heretofore been effectively limited to single color writing unless interruption by the operator was used. During the interval of operator intervention the equipment is idle. Further, such human intervention occasionally creates operational problems that bear on equipment reliability. Thus, with the advent of large multi-color plotters, smaller single-color plotters have been rendered obsolescent, notwithstanding the fact that many of these units remain in good operating condition.

OBJECTS OF THE INVENTION

Accordingly, it is a primary object of the present invention to provide a writing instrument adapted for use in multi-color plotters which avoids the limitations of prior art equipment.

It is another object of the present invention to provide a new and improved writing instrument adapted for use in computer-operated plotters and similar graphics systems which responds to successive applications of an external linear force to extend selected writing elements in succession into writing position.

It is still a further object of the present invention to provide a writing instrument adapted for incorporation into existing single-color plotters and other graphics equipment to convert the latter easily and economically to multi-color equipment.

It is still a further object of the present invention to provide a motion conversion mechanism whereby successive applications of a linear force result in successive increments of rotation in a predetermined angular direction.

These and other objects of the present invention, together with the features and advantages thereof, will become apparent from the following detailed discussion when read in conjunction with the accompanying drawings in which like reference numerals designate corresponding parts.

BRIEF DESCRIPTION OF THE DRAWINGS

FIG. 1 illustrates a preferred embodiment of the present invention in assembled form;

FIG. 2 is an exploded view of pertinent portions of the apparatus of FIG. 1;

FIGS. 4A, 4B, 4C and 4D illustrate the angular cam used in the present invention in sectioned elevation view taken at line A—A of FIG. 4B, in top view, bottom view and in developed view respectively;

FIG. 5 illustrates a preferred encoding template for use with the apparatus of FIG. 4;

FIG. 6 illustrates the pin retaining barrel of the present invention in top view;

FIG. 7 illustrates a preferred cable actuator for use with the present invention; and FIG. 8 illustrates the circuit of an exemplary optical position sensor which may be used with the present invention.

DESCRIPTION OF THE INVENTION

Figure 3A:
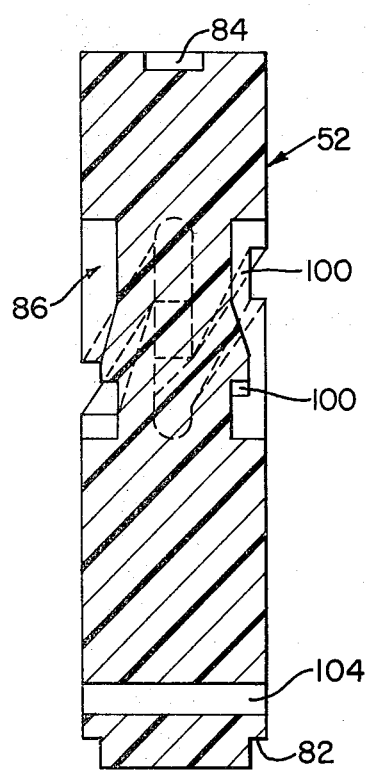
FIGS. 3A, 3B and 3C illustrate the linear cam of the present invention in elevation view, top view, and developed view respectively.

With reference now to the drawings, the writing instrument illustrated in FIG. 1 is shown for a 4-element pen of which only three elements are visible. The instrument has an elongate body 10 of generally cylindrical form which tapers down to a shank 12 of reduced diameter. An exit template 14 is secured in shank 12 and assists in guiding writing elements 16 to the desired radial position. Each writing element includes a holding end 17 and a writing nib 19. A point shroud 18 is threaded onto exit template 14, an hermetic seal being provided by a seal ring 20. One of the writing elements 16 is shown extended through a coaxial exit opening 22. A flexible seal cap 24 is adapted to make air-sealing contact with shroud 18. The purpose of seal cap 24, which is removable, is to prevent the nibs of writing elements 16 from drying out when the instrument is not in use.

In accordance with the present invention, different types of writing elements may be employed in the same writing instrument, e.g. elements having porous point nibs may be combined with elements having ball point nibs and elements with nibs of different breadths may be used in the same writing instrument. Each writing element 16 includes an ink reservoir or the like, as shown at 26 in the drawings. The contents of the reservoir will vary depending on the particular nib employed.

A pin retaining barrel 28 is threaded into body 10 and is fixedly positioned coaxial therewith. As best seen from FIG. 6, the pin retaining barrel includes a coaxial central bore 32 and a plurality of smaller bores 30 uniformly spaced from the common axis and parallel thereto. In the illustrated embodiment of the invention, four bores 30 are used spaced 90° apart from each other. A pair of slots 34, which communicate with central bore 32, are positioned so as to extend parallel to the common axis.

A top cap 38, open at one end, makes a tight fit with a recessed portion of unit 28 so as to form a substantially continuous cylindrical surface with body 10. A pair of ring seals 36 and 40, positioned between body 10 and unit 28 on the one hand, and top cap 38 and unit 28 on the other hand, guard against the leakage of air to the interior of the writing instrument.

Unit 28 includes a plurality of cam followers 42, each having the shape of an elongate pin and being positioned in one of bores 30. Each cam follower includes a necked coupling linkage 44 which engages the aforesaid holding end 17 of a corresponding writing element 16 in a manner that permits the latter to move parallel to the common axis, as well as in a radial direction relative to the cam followers. The opposite end of each cam follower forms a rounded contact end 43 which faces to the right in FIG. 1. A portion of each cam follower 42 is surrounded by a compression spring 46 which is constrained between an end wall of the corresponding bore 30 and a shoulder 48 of the cam follower. Springs 46 urge the respective cam followers 42 upward, i.e. to the right in FIG. 1.

A compression spring 50 is positioned in central bore 32 of unit 28 and is constrained between the end wall of the latter bore and a shoulder 82 of a linear cam 52. The latter is normally urged to the right in FIG. 1 by the action of spring 50. The relationship of the parts and the manner in which they fit together will become clear from a consideration of FIG. 2 which illustrates the pertinent portions of the writing instrument in exploded form.

Linear cam 52 is slidably positioned in a coaxial blind bore 54 of top cap 38. In its retracted position, as shown in FIG. 1, one end of cam 52 abuts an annular seal 56 which is positioned between the cam and the end wall of bore 54. Seal 56 prevents air from leaking to the interior of the writing instrument. The opposite end cam 52 is disposed in the upper portion of central bore 32 where spring 50 engages shoulder 82, as outlined above. Linear cam 52 further includes a transverse bore 104 in which a guide pin 106 is positioned. The ends of guide pin 106 protrude from bore 104 in diametrically opposite directions. The guide pin ends engage slots 34 of pin retaining barrel 28 in sliding relationship so as to inhibit angular motion of cam 52.

An angular cam 58 is formed substantially as a cylinder portion 108, integral with an annular wall 112, both sharing a common coaxial bore 110. Linear cam 52 slidably nests in cam 58, i.e. it engages bore 110 in a manner which permits relative axial as well as relative angular motion between the cams. Thus, the exterior cylindrical surface of linear cam 52 serves as a bearing surface for angular motion of cam 58. Top cap 38 includes an internal shoulder 138 which faces end surface 29 of pin retaining barrel 28. Cam 58 is positioned between the latter surface and shoulder 138, but out of contact with both due to the presence of a pair of thrust washers 57 to one side of the cam and another thrust washer 59 on the other side. Thus, cam 58 is constrained from moving in an axial direction, while free to rotate about its own axis, as will be explained in greater detail below. Angular cam 58 further comprises a cam surface 60, which includes a cam surface section 62 that extends out of the cam surface proper. Contact ends 43 of cam followers 42 are urged against cam surface 60 by their respective springs 46, as explained above. FIG. 1 shows one of contact ends 43 in contact with cam surface section 62.

The closed end 64 of top cap 38 includes a threaded bore 66 into which a push cable connector 68 is threaded. A push cable 69, having a core 70 and a sleeve 72, is coupled to the connector so that the sleeve is fastened thereto and the core extends through it. The exposed end 74 of core 70 contacts linear cam 52 in a shallow, cup-shaped concentric depression 84 of the end surface of the cam. A rotary coupling 73 permits cable 69 to turn relative to the writing instrument.

An opening 76 extends through top cap 38, substantially parallel to the common axis. An optical sensor 78 is positioned in opening 76 in alignment with an encoding template 142. The latter is positioned on angular cam 58. Electrical signals are provided on a set of electrical terminals 79. The sensor may comprise components of the type which are readily available commercially and they form no part of the present invention.

FIG. 3 illustrates linear cam 52 in greater detail. The cam has a generally cylindrical shape, one end of the cylinder being recessed to provide the aforesaid shoulder 82. Cup-shaped depression 84 is concentrically positioned in the surface of the opposite cylinder end. Cam 52 includes a groove 86 which closes on itself around the cam periphery to provide a closed path. Groove 86 includes a first set of groove sections 88 which are parallel to the cam axis. See FIG. 3C. In the illustrated preferred embodiment of the invention, which includes four writing elements, cam 52 contains four groove sections 88 spaced 90° apart from each other.

Each groove section 88 has opposite ends which are generally designated by the reference numerals 90 and 92. For the sake of clarity, only some of the groove section ends are so labeled in FIG. 3C. Opposite groove section ends of successive groove sections 88 are connected to each other by way of slanted groove sections 94, so that groove 86 forms a complete path around the periphery of linear cam 52. As best seen from FIG. 3C, the aforesaid path has excursions in a direction parallel to the axis of cam 52 of a magnitude equal to the length of groove sections 88.

Each groove section provides a ramp which gradually rises from a lower depth level 98 to an upper depth level 96 in a predetermined path direction. Further, the path formed by groove 86 includes a plurality of steps, each step being positioned at one of the aforesaid groove ends. Each step includes a step surface 100 which connects an upper depth level 96 of groove 86 to a lower depth level 98 and thus forms an abrupt transition between the two levels. Between successive steps, the depth level ramps up from the lower to the upper level. See FIGS. 3B and 3D.

Thus, a camming pin which follows the path established by groove 86, is able to travel only in the direction indicated by arrow 102. See FIG. 3B. At each step, the abrupt transition presented by step surface 100 drops the camming pin from depth level 96 down to depth level 98. Thereafter, the camming pin again rides up the ramp presented by either groove section 88 or 94 to depth level 96, until the subsequent step surface is reached at the next groove end where the procedure repeats. The camming pin, which is biased radially into groove 86, is inhibited from traversing the steps in a direction opposite to that indicated at 102 by the steepness and height of step surfaces 100.

FIG. 4 illustrates angular cam 58 in greater detail. As shown, the cam comprises a hollow cylinder portion 108 having a bore 110, and an annular wall 112 integral with the cylinder and disposed near one end thereof normal to the cylinder axis. A peripheral channel 114 divides wall 112 into upper and lower annular flanges 112A and 112B respectively. Flange 112A includes a raised annular rim 115 positioned adjacent bore 110, and a similar rim 116 at the flange periphery. As seen in the view of FIG. 4A, the lower surface of flange 112B constitutes the aforesaid cam surface 60 from which cam surface section 62 extends in a downward direction.

Cylinder portion 108 further includes a pair of diametrically opposed holes 118 and 120 which communicate between bore 110 and peripheral channel 114. Channel 114 is blocked by a land 122 which extends between flanges 112A and 112B substantially the entire depth of the channel.

As best seen from FIGS. 4C and 4D, cam surface 60 is substantially annular and is positioned immediately adjacent cylinder portion 108. Cam surface section 62 includes a rise portion 124 which is slanted with respect to the remaining portion of cam surface 60; a dwell portion 126 which is substantially parallel to surface 60; and a return portion 128 which forms an angle with surface 60 that approaches 90°. The height of cam surface section 62, i.e. the spacing of dwell surface 126 from surface 60 in a direction parallel to the common axis, is seen to be equal to that of cylinder portion 108.

As seen from FIG. 2, a pair of camming pins 130 are adapted to be positioned in diametrically opposed holes 118 and 120 of angular cam 58. A substantially circular clip 134 is disposed in peripheral channel 114 and is adapted to bear resiliently against the ends of pins 130. Thus, clip 134 biases camming pins 130 into groove 86. The ends of clip 134 straddle land 122 and the clip is thus prevented from rotating relative to the cam and holes 118 and 120 remain covered.

Inner and outer rims 115 and 116 respectively, of angular cam 58, define an annular surface 80 between them. Outer rim 116 includes a keyway 140, as shown in FIG. 4B. FIG. 5 illustrates an annular encoding template 142 which is dimensioned to fit between rims 115 and 116 without rising above the latter. For the 4-element writing instrument described, the template contains four areas 144, 146, 148 and 150, each having a different reflectivity to incident light. A key 152 is adapted to mate with keyway 140 in rim 116. Thus, when the key engages the keyway, the encoding template is positionally referenced with respect to cam surface section 62.

As previously explained, the writing instrument is capable of moving relative to the paper on which plotting takes place in existing plotters. In accordance with the principles of the present invention, the actuation unit for the writing instrument remains fixed in place. The actuation unit is illustrated in FIG. 7 and comprises a solenoid 160 mounted on one arm 164 of a bracket 162. The bracket may be fastened to a fixed surface. Solenoid 160 includes a plunger 166 which is adapted to push against core 70 of cable 69 within the tubular portion of a push cable end assembly 173 to which sleeve 72 of cable 69 is fastened. Cable 69 passes through a threaded bushing 172. The latter is mounted on a second bracket arm 168 by means of bushing head 177 and a threaded nut 175 which bear against opposite sides of arm 168. A rotary coupling 170 permits cable 69 to rotate with respect to bushing 172. A compression spring 181 encircles the tubular portion of assembly end 173 and is interposed between a pair of backing washers 171 and 179. Solenoid 160 is energized by the application of a suitable electrical signal to terminals 161.

FIG. 8 illustrates an exemplary circuit of the type that may be used in optical sensor 78. A light source 190, e.g. a light emitting diode coupled between terminal 79A and a common ground 79B shines light represented by arrow 192 onto the surface of encoding template 142 upon being energized. Light reflected from the template, indicated by arrow 194, is received by photodetector 196 which provides a responsive output signal between terminals 79C and 79B. A partition 198 is positioned between units 190 and 196 in order to minimize the amount of stray light which reaches unit 196.

As explained above, in the normal operation of a plotter either the writing instrument alone may move with respect to the paper or, more commonly, the pen and the paper move, each along one coordinate axis. The relative movement may be controlled by computer-derived signals, so that various types of curves may be drawn. Likewise, a computer-controlled signal brings the writing instrument into contact with the paper, or withdraws it from paper contact, both by solenoid action.

When the writing instrument which forms the subject matter of the present invention is used in connection with plotters or other graphic systems of the type described, a change of writing elements is initiated by the application of a signal to terminals 161 of solenoid 160. The actuation of the solenoid causes solenoid plunger 166 to push against core 70 of cable 69. The applied force is transmitted through cable 69 and forces core end 74 against linear cam 52 within cup-shaped depression 84. Since the axial force applied to cam 52 exceeds the force exerted in the opposite direction by spring 50, cam 52 is forced down into central bore 32 of pin retaining barrel 28. Simultaneously, the protruding ends of guide pin 106 move down in slots 34 of unit 28.

As linear cam 52 moves axially downward, (to the left in FIG. 1), radially biased camming pins 130 are prevented from advancing up groove sections 88 by the presence of a step surface 100 in each groove end 92. Thus, unable to advance in groove sections 88 which are parallel to the common axis, each resiliently biased camming pin is forced by the axial motion of cam 52 to ramp up one of the slanted groove sections 94. The path portion thus traced through by each camming pin extends from groove end 92 in a first groove section 88 to groove end 90 of the subsequent groove section 88.

Figure 3B:
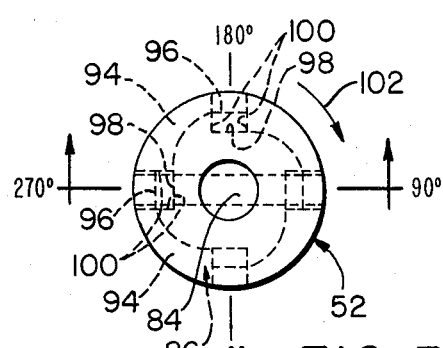
Figure 3D:
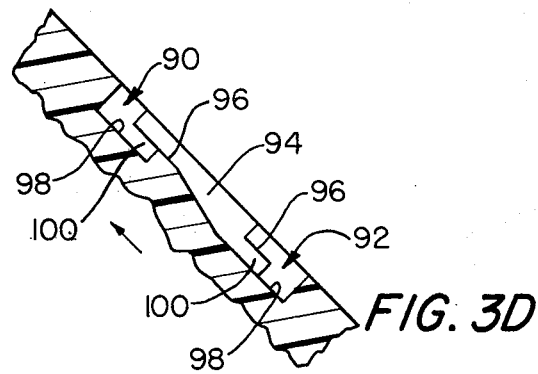
FIG. 3D is a sectional view of the apparatus of FIG. 3C taken at line D—D.
Figure 3C:
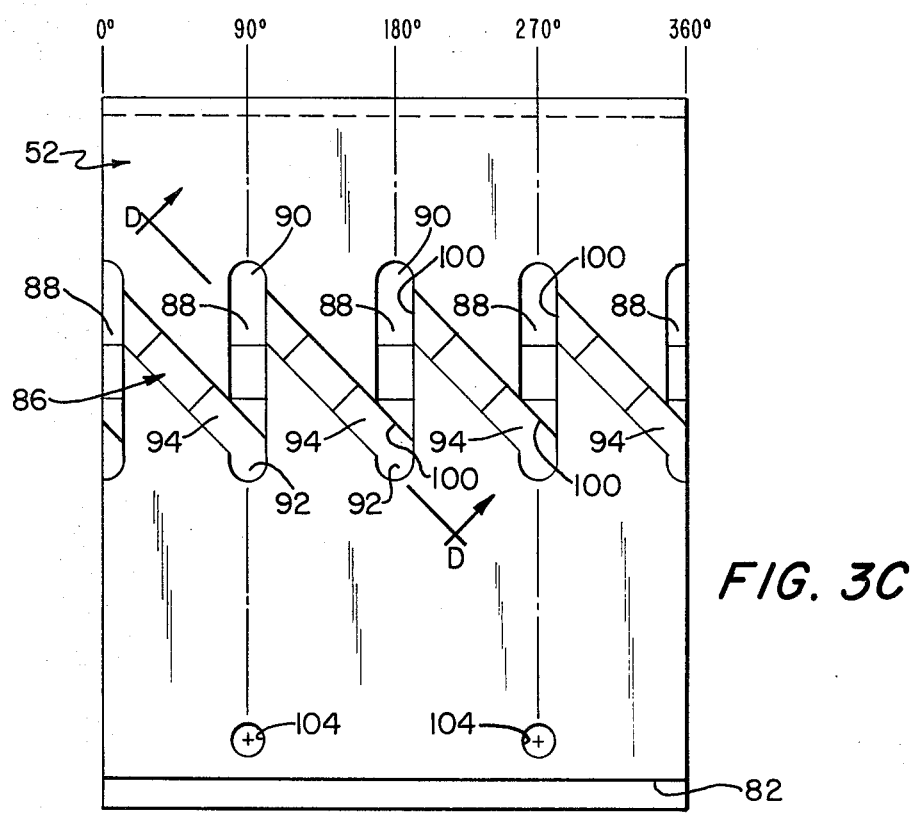

As will be clear from a consideration of FIGS. 3B and 3D, the travel of the camming pins along the ramp provided by groove sections 94 causes each pin to rise from lower depth level 98 to upper depth level 96 within the groove. As linear cam 52 reaches the limit of its axial excursion, each camming pin traverses another step surface 100 at groove end 90. Under the urging of the bias force applied thereto by resilient clip 134 the camming pin drops abruptly down to depth level 98 from level 96.

Linear cam 52 is capable only of axial movement due to the constraints against angular motion imposed by fixed slots 34 in which the ends of guide pins 106 slide parallel to the common axis. Thus, as camming pins 130 trace through their respective groove sections 94, only angular motion is imparted to angular cam 58. The axial motion of cam 52 is not transmitted to cam 58 because the latter is constrained against such motion. Because groove sections 88 are spaced 90° apart from each other, cam 58 rotates 90° whenever linear cam 52 is depressed in an axial direction.

As will be apparent from FIGS. 4C and 4D, the total angle of cam surface section 62 is at most 90° and is preferably smaller. Thus, for each 90° rotation of angular cam 58, section 62 advances by 90° to bring dwell portion 126 into alignment with one of cam followers 42. The latter cam follower is linearly displaced to the left in FIG. 1, against the action of its compression spring 46. The displacement causes nib 19 of the corresponding writing element 16 to be extended through exit opening 22 in point shroud 18.

In order to avoid damage to the selection mechanism and other parts of the writing instrument, it is important that no additonal force be applied to linear cam 52 when the latter reaches the limit of its travel to the left in FIG. 1. This limit is established when spring 50 is completely compressed. At that point cam 52 is said to "bottom" and cable core 70 and sleeve 72 in effect act as an integral unit. Any additional force applied by solenoid plunger 166 causes assembly end 173 to move to the right in FIG. 7, pushing spring washer 171 in the same direction against the force of compression spring 181. Thus, spring 181 takes up any overstroke that may occur and protects the writing instrument from damage.

When solenoid 160 is deenergized, contact point 74 of cable core 70 is withdrawn and linear cam 52 returns to the retracted position shown in FIG. 1 under the urging of compression spring 50. During this action, camming pins 130 ride in contact with respective groove sections 88. Specifically, at the beginning of the return travel of cam 52 toward its normal retracted position, the groove-contacting end of each camming pin 130 is positioned at a groove end 90, past step surface 100. As cam 52 moves up, (to the right in FIG. 1), each camming pin traces through a groove section 88 in a downward direction until it reaches groove end 92 of the same groove section. Concurrently, each pin ramps up from depth level 98 to depth level 96 as it traces through groove section 88. At groove end 92 each pin traverses step surface 100, dropping from upper depth level 96 to lower level 98. Since groove sections 88 are parallel to the common axis, no angular motion is imparted to angular cam 58 during the foregoing action and cam 58 remains stationary. At the conclusion of the return motion of cam 52 to its retracted position, each camming pin is positioned beyond step surface 100. Therefore, when a force is subsequently applied to cam 52, each camming pin is constrained to trace through a slanted groove section 94.

Subsequent applications of an energizing signal to terminals 161 each result in a 90° rotation of angular cam 58 and advance dwell portion 126 by a corresponding angle. Accordingly, cam followers 42 are linearly displaced in succession and their corresponding writing elements are successively brought into writing position.

Each rotation of cam 58 by 90° brings a different section of encoding template 142 opposite optical sensor 78. Since the different sections having different reflectivity, the amplitude of the output signal derived at terminals 79 is distinguishably different for each angular position of cam 58. Accordingly, the signal may be used to determine which writing element, e.g. which color, is in writing position at any given time. For a computer-operated plotter system, such information may be fed back to the computer to bring the desired writing element into writing position.

From the foregoing discussion it will be apparent that many variations and modifications are possible within the scope of the present invention. For example, cam 52 may be constrained against angular motion by placing the guide pin near the top surface of the cam, clear of groove 86. In such an arrangement suitable slots are provided in top cap 38 for the protruding ends of the guide pin. Cam rotation may also be constrained by a bore of specific cross section in cam 52, e.g. of square cross section, engaged either from the top or from the bottom by a shaft having an identical cross section.

While the use of two camming pins is preferred, any number of such pins may be used, suitably positioned to engage groove 86.

Cam 58 need not have the configuration illustrated in the drawings. For example, peripheral channel 114 and resilient clip 134 may be dispensed with in favor of an arrangement whereby guide pins 130 are individually spring-biased within their respective holes 118 and 120, into contact with groove 86.

Although an optical position sensor is preferred, the rotation of angular cam 58 may also be detected by other means, e.g. by electric field position sensors. Similarly, position sensing may be carried out by contact sensors, e.g. using a contact brush or the like.

The selection unit may be modified in a number of respects without departing from the principles of the present invention. For example, linear cam 52 may take the form of a hollow cylinder within which angular cam 58 is coaxially nested. In the latter case, the camming groove is disposed on the interior cylindrical surface and the camming pins are biased radially outward.

In an alternative arrangement, cam 58 may be completely immobilized and cam 52, whether nested within the angular cam or surrounding it, may be disposed in a manner that permits axial as well as angular motion. In the latter arrangement, camming groove 86 and camming pins 130 are interchangeable as far as concerns their respective positions on the two cams is concerned. Further, since cam 52 will execute axial as well as angular movement upon the application thereto of an axial force, the cam surface as well as the encoding template are both positioned on cam 52 in such an arrangement.

While solenoid 160 is described as being responsive to computer-originated signals, such need not be the case and the solenoid may be switch-activated by the plotter operator. Alternatively, the solenoid may be dispensed with entirely in favor of a manually operated push cable release positioned either on top of the pen, or remotely supported. In both cases, alternate means of displaying the selected element may be desirable, e.g. visually observable means.

From the foregoing discussion it will be apparent that numerous modifications, substitutions, variations, changes and equivalents will now occur to those skilled in the art, all of which fall within the spirit and scope contemplated by the present invention. Accordingly, it is intended that the invention be limited only by the scope of the appended claims.

What is claimed is:

1. A writing instrument comprising:
    an elongate hollow body having at one end thereof an exit opening concentric with the axis of said body;
    a plurality of elongate writing elements disposed in said body, each including a writing point and a holding end spaced from each other, said writing elements being positioned around said body axis at a substantially uniform radial spacing;
    a selection unit coaxially positioned at the opposite end of said body, said selection unit comprising first and second cams nested with respect to each other to permit relative motion therebetween;
    said first cam including a cylindrical surface coaxial with said body and a camming groove forming a continuous path around the periphery of said cylindrical surface, said path including excursions of a predetermined magnitude in a direction parallel to said axis;
    means for mounting said first cam exclusively for linear motion in an axial direction;
    means for mounting said second cam exclusively for angular motion about said axis;
    at least one camming pin carried by said second cam;
    means for radially biasing said camming pin into engagement with said groove;
    a plurality of steps positioned at selected points in said groove, each of said steps including a surface providing an abrupt transition between an upper depth level and a lower depth level of said groove, said step surfaces being oriented to inhibit said camming pin from traversing said steps opposite to a predetermined path direction, the groove depth between successive steps ramping up from said lower to said upper level in said predetermined path direction;
    said second cam including a wall substantially normal to said axis and including an annular coaxial opening, said cam wall including an annular cam surface facing in a first axial direction, a section of said annular cam surface extending to a predetermined height in said first axial direction;
    a plurality of elongate cam followers each corresponding to one of said writing elements, said cam followers being uniformly disposed around said axis for movement parallel thereto in alignment with said annular cam surface;
    means for biasing said cam followers into contact with said annular cam surface;
    means for linking each of said cam followers to said holding end of a corresponding writing element; and
    means for selectively applying an external, axial force to said first cam in said first axial direction;
    whereby successive applications of said externally applied axial force are effective to rotate said cam surface section in a predetermined angular direction into alignment with successive ones of said cam followers, each of said cam followers and the writing element linked thereto being displaced in succession by said cam surface section a distance equal to said predetermined height to advance the writing point of the displaced writing element through said exit opening.

2. Apparatus in accordance with claim 1 wherein said groove comprises a plurality of first groove sections substantially parallel to said axis and uniformly spaced around the periphery of said cylinder, each of said first groove sections having a length equal to said predetermined magnitude; and
    second groove sections connecting opposite ends of successive first groove sections to each other;
    each of said groove section ends including one of said steps.

3. Apparatus in accordance with claim 2 wherein said apparatus comprises two camming pins carried by said second cam, said first cam is formed as a cylinder, said groove encircling the outside surface of said cylinder;
    said second cam comprising a cylindrical portion integral with said wall and including an axial bore coincident with said annular wall opening;
    said first cam being coaxially disposed within said bore;
    a pair of diametrically opposed holes in said second cam extending radially outward from said bore;
    one of said camming pins being disposed in each of said holes;
    means for biasing said pins radially inward into engagement with said groove; and
    means for axially biasing said first cam to a retracted position, said externally applied force being adapted to move said first cam against said last-recited biasing means to a position axially displaced from said retracted position;
    whereby, upon each application of said external force to said first cam, each of said camming pins traces through one of said second groove sections to rotate said second cam through an angle of rotation substantially equal in magnitude to the angular spacing of successive first groove sections, said camming pins tracing through one of said first groove sections upon the return of said first cam to said retracted position while said second cam remains stationary.

4. Apparatus in accordance with claim 3 wherein said angle of rotation is at least equal to the angle defined by said cam surface section.

5. Apparatus in accordance with claim 4 wherein said cam surface section includes in succession a rise portion sloping with respect to said cam wall, a dwell portion of limited extent substantially parallel to said wall at said predetermined height, and a return portion positioned at an angle to said wall approaching 90°;
whereby successive applications of said external axial force rotate said dwell portion into contact with successive ones of said cam followers.

6. Apparatus in accordance with claim 3 wherein said cam wall includes a peripheral channel communicating with said radially extending holes;
blocking means formed in said channel; and
a resilient clip disposed in said channel adapted to make contact with said camming pins to urge them into said groove, the ends of said clip being positioned on opposite sides of said blocking means to inhibit rotational movement of said clip within said channel.

7. Apparatus in accordance with claim 6 wherein each of said cam followers is formed as an elongate pin including a first end in contact with said annular cam surface and a second end linked to said holding end of the corresponding writing element;
a pin retaining barrel coaxially fixed within said body, said barrel including a plurality of bores each adapted to hold one of said cam followers for movement parallel to said axis; and
said means for biasing said cam followers comprising spring means disposed in each of said bores for urging said cam followers into contact with said annular cam surface.

8. Apparatus in accordance with claim 7 and further including a top cap closing off said opposite body end;
said top cap including a concentric blind bore opening in said first axial direction and receiving a portion of said first cam in a sliding fit;
a pair of diametrically opposite slots having a fixed position with respect to said body parallel to said axis; and
a pair of guides protruding in diametrically opposed directions from the cylindrical outer surface of said first cam axially spaced from said groove, said guides slidably engaging said pair of slots to inhibit angular motion of said first cam while permitting axial motion relative to said body;
a central bore coaxially disposed in said pin retaining barrel; and
said axial biasing means for said first cam comprising a compression spring disposed in said central bore adapted to urge said first cam against the end wall of said blind bore.

9. Apparatus in accordace with claim 8 wherein said top cap includes an internal shoulder substantially normal to said axis and facing in said first axial direction;
said pin retaining barrel terminating in a surface parallel to said shoulder and spaced therefrom; and
wherein said second cam is disposed between said last recited surface and said shoulder in a manner restraining axial motion of said second cam while permitting angular motion thereof relative to said body.

10. Apparatus in accordance with claim 8 and further including a guide pin diametrically extending through said first cam, said guide pin including a pair of protruding ends to form said guides; and
said slots being disposed in said pin retaining barrel in communication with said central bore.

11. Apparatus in accordance with claim 8 and further comprising a cable connector coaxially mounted on said top cap and extending through the closed end thereof; and
a flexible push cable held by said connector and adapted to rotate relative thereto, said cable comprising a sleeve and a core movable relative to said sleeve, said cable core extending through said end wall of said blind bore into contact with said first cam and being adapted to apply said axial force to said first cam.

12. Apparatus in accordance with claim 11 and further including a solenoid mounted separate from said writing instrument, said solenoid including a plunger and means for energizing said solenoid to extend said plunger beyond said solenoid;
a cable end assembly including first and second washers and a compression spring positioned therebetween and aligned therewith, said end assembly being positioned in alignment with said plunger such that said second washer is mounted at a fixed spacing from said solenoid and said first washer is disposed within said spacing;
said cable passing through said second washer and said spring to said first washer and being fastened to the latter by said sleeve;
whereby said first washer is urged against said last-recited spring toward said second washer whenever the resistance to the force applied by said cable core exceeds a predetermined magnitude.

13. Apparatus in accordance with claim 8 wherein said cam wall includes an annular surface normal to said axis and facing opposite to said first axial direction;
a plurality of indicia carried by said last-recited cam wall surface, each of said indicia corresponding to one of said writing elements and being angularly referenced to said cam surface section;
an opening extending through said top cap parallel to said axis and in alignment with said indicia-carrying cam wall surface; and
recognition means positioned in said opening adapted to provide a discrete signal for each of said indicia rotated into alignment with said opening.

14. Apparatus in accordance with claim 13 and further including a template supported on said last-recited cam wall surface, said indicia comprising surface areas of different reflectivity on said template each extending through an angle substantially equal to said angle of rotation; and
wherein said recognition means comprises a light source and a photo detector positioned to receive the light of said source reflected from said indicia.

15. A writing instrument comprising:
an elongate hollow body having at one end thereof an exit opening concentric with the axis of said body;
a plurality of elongate writing elements disposed in said body each including a writing point and a holding end spaced from each other, said writing elements being positioned around said body axis at a substantially uniform radial spacing;

a selection unit coaxially positioned at the opposite end of said body, said selection unit comprising first and second components having a common axis, said components being nested with respect to each other to permit relative linear and angular motion therebetween along said axis and about said axis respectively;

at least said first component including a cylindrical surface coaxial with said body;

a camming groove forming a continuous path around the periphery of said cylindrical surface, said path including excursions of a predetermined magnitude in a direction parallel to said axis;

at least one camming pin carried by said second component radially biased into engagement with said groove;

a plurality of steps positioned at selected points in said groove, each of said steps including a surface providing an abrupt transition between an upper depth level and a lower depth level of said groove, said step surfaces being oriented to inhibit said camming pin from traversing said steps opposite to a predetermined path direction;

whereby the relative linear motion of said components upon successive applications of an external linear force to said selection unit produces relative angular motion of said components so as to advance the writing point of successively selected elements through said exit opening.

16. Apparatus in accordance with claim 15 and further including a ramp surface forming a continuous transition between each pair of successive steps, each of said ramp surfaces rising from said lower to said upper depth level in said predetermined path direction.

17. Apparatus in accordance with claim 16 wherein said groove includes first and second groove sections each substantially coextensive with one of said ramp surfaces, each of said first groove sections being substantially parallel to said axis, and each of said second groove sections connecting one end of a first groove section to the opposite end of the successive first groove section.

18. In a writing instrument of the type comprising an elongated hollow body having at one end thereof an exit opening, a plurality of elongated writing elements disposed in said body, each including a writing point at one end, said writing elements being positioned substantially parallel to and radially spaced from a center axis and mounted so that said elements can be selectively and sequentially moved substantially parallel to said axis between a retracted position wherein the writing point of a selected one of said elements is disposed within said body and an extended position wherein the writing point of said selected element extends through said exit opening; selection means for selectively and sequentially moving each of said elements from its retracted position to its extended position; and means for moving each of said elements from said extended position to said retracted position, the improvement wherein:

said selection means comprises (1) first camming means including a cylinder coaxially mounted with respect to said axis and having a cam formed on the cylindrical surface so as to provide a continuous path around said surface, said first camming means being movable, relative to said body, substantially only linearly along said axis in response to an axial force applied to said first camming means in the direction of said axis; and (2) second camming means mounted coaxially with said first camming means and including at least one follower in engagement with said cam so that in response to said axial force said second camming means moves, relative to said body, exclusively angularly about said axis.

19. A writing instrument according to claim 18, wherein each of said writing elements includes a holding end opposite said writing end, said second camming means includes a cam wall transverse to said axis, said cam wall including an annular cam surface facing in a first axial direction, a section of said surface extending to a predetermined height in said first axial direction; a plurality of elongate cam followers each corresponding to one of said writing elements, said cam followers being uniformly disposed around said axis for movement substantially parallel thereto in alignment with said annular cam surface; means for biasing each of said cam followers into contact with said cam surface; and means for linking each of said cam followers to the holding end of a corresponding writing element.

20. A writing instrument according to claim 19, further comprising means for selectively applying an axial force to said first camming means in the direction of said axis so that successive applications of an axial force are effective to sequentially rotate said cam surface section in a predetermined angular direction into alignment with successive ones of said cam followers, each of said cam followers and the writing element linked thereto being displaced sequentially by said cam surface portion a distance equal to said predetermined height to advance the corresponding writing element from its retracted position to its extended position.

21. A writing instrument according to claim 20, wherein said cam formed on the cylindrical surface includes a groove, and said follower includes a pin, said instrument further including means for biasing said pin into engagement with said groove, wherein said groove is formed to include a plurality of steps each including a surface providing an abrupt transition between an upper depth level and a lower depth level of said groove, said steps being oriented so as to inhibit said pin from traversing said steps opposite to a predetermined path direction and so that said second camming means moves angularly in only one direction about said axis.

22. A writing instrument according to claim 20, wherein said cam wall further includes a substantially flat arcuate section disposed in a plane substantially normal to said axis said cam surface section includes in succession a rise portion sloping with respect to said flat arcuate section, a dwell portion of limited extent extending substantially parallel to said flat arcuate portion and a return portion, said flat arcuate and cam surface sections being shaped and dimensioned so that successive applications of an axial force to said first camming means sequentially rotates said dwell portion into contact with successive ones of said cam followers.

23. A writing instrument according to claim 18, wherein said cam formed on the cylindrical surface includes a groove, said follower includes a pin, said first camming means includes a cylindrical element having an outer surface defining said cylindrical surface; said second camming means comprises an annular element having an axial bore so as to coaxially receive and nest with at least a portion of said cylindrical element, said pin extending radially inward into said bore so as to engage said groove.

24. A writing instrument according to claim 23, wherein said annular element includes at least one radially-directed hole communicating with said axial bore for receiving said pin so that said pin extends radially through said hole into said bore, and means for baising said pin into engagement with said groove.

25. For use in a graphic system, an improved writing instrument of the type comprising an elongated hollow body having at one end thereof an exit opening substantially coaxially aligned with the central axis of said body; a plurality of elongated writing elements disposed in said body, each including a writing point at one end, said writing elements being positioned substantially parallel to and radially spaced from said center axis and mounted so that said elements can be selectively and sequentially moved substantially parallel to said axis between a retracted position wherein the writing point of a selected one of said elements is disposed within said body and an extended position wherein the writing point of said selected elements extends through said exit opening; means for selectively and sequentially moving each of said elements from the retracted position to its extended position; means for moving the selected element from its extended position to its retracted position; and indicative means for providing a discrete electrical signal indicative of said selected element in the extended position, wherein said means for selectively and sequentially moving said selected element from its retracted position comprises cam means mounted for rotation about said axis, and said indicative means comprises (1) a like plurality of indicia, each corresponding to a different one of said elements, carried by said cam means and (2) recognition means positioned relative to said cam means and the indicium corresponding to said selected element so as to provide the corresponding discrete signal.

26. An instrument according to claim 25, wherein said plurality of indicia comprises a like plurality of surface areas, each being of a different reflectivity to incident radiation of a preselected wavelength, and said recognition means comprises a source means for directing radiation including said preselected wavelength toward the select surface area corresponding to said selected element, and detector means positioned so as to receive radiation reflected from said select surface area and for producing said discrete signal in response thereto.

* * * * *